United States Patent
Zhu et al.

(10) Patent No.: US 12,472,293 B2
(45) Date of Patent: Nov. 18, 2025

(54) PREDICTING ULTRAFILTRATION VOLUME IN PERITONEAL DIALYSIS PATIENTS

(71) Applicant: FRESENIUS MEDICAL CARE HOLDINGS, INC., Waltham, MA (US)

(72) Inventors: Fansan Zhu, Flushing, NY (US); Peter Kotanko, New York, NY (US); Laura Rosales, Flushing, NY (US); Jun Yi, New York, NY (US)

(73) Assignee: FRESENIUS MEDICAL CARE HOLDINGS, INC., Waltham, MA (US)

( * ) Notice: Subject to any disclaimer, the term of this patent is extended or adjusted under 35 U.S.C. 154(b) by 479 days.

(21) Appl. No.: 18/058,021

(22) Filed: Nov. 22, 2022

(65) Prior Publication Data

US 2023/0166017 A1 Jun. 1, 2023

Related U.S. Application Data

(60) Provisional application No. 63/284,131, filed on Nov. 30, 2021.

(51) Int. Cl.
*A61M 1/28* (2006.01)
*G16H 40/63* (2018.01)

(52) U.S. Cl.
CPC .............. *A61M 1/28* (2013.01); *A61M 1/281* (2014.02); *A61M 1/282* (2014.02); *A61M 1/284* (2014.02); *A61M 1/285* (2013.01); *G16H 40/63* (2018.01); *A61M 2205/3331* (2013.01); *A61M 2205/3334* (2013.01); *A61M 2205/3344* (2013.01); *A61M 2205/3368* (2013.01);

(Continued)

(58) Field of Classification Search
CPC ........ A61M 1/28; A61M 1/281; A61M 1/282; A61M 1/284; A61M 1/285; A61M 2205/3331; A61M 2205/3334; A61M 2205/3344; A61M 2205/3368; A61M 2205/3372; A61M 2205/3379; A61M 2205/3393; A61M 2205/52; G16H 40/63
See application file for complete search history.

(56) References Cited

U.S. PATENT DOCUMENTS

| | | |
|---|---|---|
| 6,228,047 B1 | 5/2001 | Dadson |
| 2010/0004590 A1 | 1/2010 | Hedmann et al. |
| 2017/0232176 A1 | 8/2017 | Hochrein et al. |

(Continued)

FOREIGN PATENT DOCUMENTS

| | | |
|---|---|---|
| WO | 2018210904 A1 | 11/2018 |
| WO | 2022232686 A1 | 11/2022 |

OTHER PUBLICATIONS

International Search Report and Written Opinion from corresponding International Application No. PCT/US2022/051326 dated Apr. 5, 2023.

(Continued)

*Primary Examiner* — John Kim
(74) *Attorney, Agent, or Firm* — Lando & Anastasi, LLP

(57) ABSTRACT

Techniques for monitoring intraperitoneal volume (IPV) during a dwell period of a peritoneal dialysis patient include monitoring intraperitoneal pressure (IPP) during the dwell period using a pressure sensor, monitoring the density of the dialysate during the dwell period, and determining a change in IPV based at least on a change in IPP and a change in the density of the dialysate during the dwell period.

8 Claims, 14 Drawing Sheets

(52) U.S. Cl.
CPC ............... *A61M 2205/3372* (2013.01); *A61M 2205/3379* (2013.01); *A61M 2205/3393* (2013.01); *A61M 2205/52* (2013.01)

(56) References Cited

U.S. PATENT DOCUMENTS

| | | | |
|---|---|---|---|
| 2017/0368249 | A1 | 12/2017 | Bourne |
| 2019/0358387 | A1 | 11/2019 | Elbadry et al. |
| 2020/0353148 | A1 | 11/2020 | Chamney et al. |
| 2021/0038797 | A1 | 2/2021 | Hochrein et al. |
| 2021/0178043 | A1 | 6/2021 | Gerber et al. |

OTHER PUBLICATIONS

Dejardin et al., "Intraperitoneal pressure in PD patients: relationship to intraperitoneal volume, body size and PD-related complications", NDT 22:1437-44, 2007.

Durand et al., "Intraperitoneal Hydrostatic Pressure and Ultrafiltration Volume in CAPD", Adv Perit Dial 1992 8:108-112.

Margetts et al., "Acquired ultrafiltration dysfunction in peritoneal dialysis patients," J Am Soc Nephrol, vol. 13, No. 11, pp. 2787-2794, Nov. 2002.

Morelle et al., "ISPD recommendations for the evaluation of peritoneal membrane dysfunction in adults: Classification, measurement, interpretation and rationale for intervention," Perit Dial Int, vol. 41, No. 4, pp. 352-372, Jul. 2021.

Perez-Diaz et al., "Clinical relevance of marginal factors on ultrafiltration in peritoneal dialysis", Peritoneal dialysis International: Journal of the International Society for Peritoneal Dialysis. Jan. 2021;41(1):86-95. PubMed PMID: 32048915.

Stachowska-Pietka et al., "Distributed model of peritoneal fluid absorption," Am J Physiol Heart Circ Physiol, vol. 291, No. 4, pp. H1862-H1874, Oct. 2006.

Teixido-Planas et al., "Measuring peritoneal absorption with the prolonged peritoneal equilibration test from 4 to 8 hours using various glucose concentrations," Perit Dial Int, vol. 34, No. 6, pp. 605-611, Sep.-Oct. 2014.

Twardowski et al., "High volume low frequency continuous ambulatory peritoneal dialysis", Kidney Int. Jan. 23, 1983(1):64-70.

Zhu et al., "Monitoring of Intraperitoneal Fluid Volume during Peritoneal Equilibration Testing using Segmental Bioimpedance", Kidney Blood Press Research 2019; 44:1465-1475.

PREDICTING ULTRAFILTRATION VOLUME IN PERITONEAL DIALYSIS PATIENTS

CROSS REFERENCE TO RELATED APPLICATIONS

This application claims priority under 35 U.S.C. § 119(e) to provisional application No. 63/284,131 titled PREDICTING ULTRAFILTRATION VOLUME IN PERITONEAL DIALYSIS PATIENTS, filed Nov. 30, 2021, which is incorporated by reference in its entirety for all purposes.

BACKGROUND

Renal dysfunction or failure and, in particular, end-stage renal disease, causes the body to lose the ability to remove water and minerals and excrete harmful metabolites, maintain acid-base balance, and control electrolyte and mineral concentrations within physiological ranges. Toxic uremic waste metabolites including urea, creatinine, uric acid, and phosphorus accumulate in the body's tissues, which can result in a person's death if the filtration function of the kidney is not replaced.

Dialysis is a treatment used to support a patient with insufficient renal function. The two principal dialysis methods are hemodialysis and peritoneal dialysis. During hemodialysis ("HD"), the patient's blood is passed through a dialyzer of the dialysis machine while also passing a dialysis solution or dialysate through the dialyzer. During peritoneal dialysis ("PD"), the patient's peritoneal cavity is periodically infused with dialysate. The membranous lining of the patient's peritoneum acts as a natural semi-permeable membrane that allows diffusion and osmosis exchanges to take place between the solution and the blood stream. These exchanges across the patient's peritoneum result in the removal of waste products, including solutes like urea and creatinine, from the blood, and regulate the levels of other substances, such as sodium and water, in the blood. Automated PD machines called PD cyclers are designed to control the entire PD process so that it can be performed at home usually overnight without clinical staff in attendance. This process is termed continuous cycler-assisted PD ("CCPD"). Many PD cyclers are designed to automatically infuse, dwell, and drain dialysate to and from the patient's peritoneal cavity. The treatment typically lasts for several hours, often beginning with an initial drain cycle to empty the peritoneal cavity of used or spent dialysate. The sequence then proceeds through the succession of fill, dwell, and drain phases that follow one after the other. Each phase is called a cycle. Peritoneal dialysis (PD) treatment has been increasingly used in patients with end-stage kidney disease (ESKD) because it can be performed in the patient's home and/or another non-clinical setting.

In a healthy subject, normal kidney function serves to maintain fluid status in balance, avoiding both overhydration and dehydration. Prolonged periods of overhydration or dehydration can increase cardiovascular risk. In order to maintain PD patient's fluid status optimally, it is advantageous to have the capability for precise control of ultrafiltration in order to avoid or minimize overhydration or dehydration. By contrast with HD, in PD, there is no ultrafiltration pump that can mechanically pull excess fluid from the patient's body tissues. Instead, glucose in the PD dialysate solution provides osmotic pressure needed to drive ultrafiltration. However, PD is less precise than HD at controlling ultrafiltration rate (UFR) to adjust ultrafiltration volume (UFV) and remove excess water appropriately. This drawback of PD is attributable, at least in part, to a lack of (1) efficient measuring tools and (2) sufficient understanding of the variability of individual characteristics of the peritoneal membrane.

SUMMARY

According to at least one aspect of the present disclosure, a method for monitoring intraperitoneal volume (IPV) during a dwell period is provided. The method for monitoring IPV during dwell includes: monitoring intraperitoneal pressure (IPP) during the dwell period using a pressure sensor; and determining a change in IPV based at least on a change in IPP during the dwell period. The change in IPV may be determined at least in part using an equation including:

$$dIPV = -\frac{k}{g \cdot h} dIPP,$$

where g represents acceleration of gravity, h represents a vertical distance between the pressure sensor and intraperitoneal fluid volume, and k is a coefficient. The change in IPV may be determined at least in part using an equation including: $dIPP = g \cdot [\rho \cdot \Delta h - h \cdot \Delta \rho]$, where g represents acceleration of gravity, $\rho$ represents density of dialysate solution, h represents a vertical distance between the pressure sensor and intraperitoneal fluid volume, and the change in IPV is inversely related to the change in IPP.

In general, in one aspect, a peritoneal dialysis cycler includes: a pressure sensor configured to measure intraperitoneal pressure (IPP); one or more hardware processors; and one or more non-transitory computer-readable media storing instructions that, when executed by the one or more hardware processors, cause the one or more hardware processors to perform operations. The operations include: monitoring intraperitoneal volume (IPV) during a dwell period of a peritoneal dialysis patient, at least by monitoring IPP during the dwell period using the pressure sensor; and determining a change in IPV based at least on a change in IPP during the dwell period. The change in IPV may be determined at least in part using an equation including:

$$dIPV = -\frac{k}{g \cdot h} dIPP,$$

where g represents acceleration of gravity, h represents a vertical distance between the pressure sensor and intraperitoneal fluid volume, and k is a coefficient. The change in IPV may be determined at least in part using an equation including: $dIPP = g \cdot [\rho \cdot \Delta h - h \cdot \Delta \rho]$, where g represents acceleration of gravity, $\rho$ represents density of dialysate solution, h represents a vertical distance between the pressure sensor and intraperitoneal fluid volume, and the change in IPV is inversely related to the change in IPP.

In general, in one aspect, a system includes: at least one device including one or more hardware processors; and one or more non-transitory computer-readable media storing instructions that, when executed by the one or more hardware processors, cause the one or more hardware processors to perform operations. The operations include: monitoring intraperitoneal volume (IPV) during a dwell period of a peritoneal dialysis patient, at least by monitoring intraperitoneal pressure (IPP) during the dwell period using a pressure sensor, and determining a change in IPV based at least on a change in IPP during the dwell period. The change in IPV may $$dIPV = -\frac{k}{g \cdot h} dIPP,$$

be determined at least in part using an equation including: where g represents acceleration of gravity, h represents a vertical distance between the pressure sensor and intraperitoneal fluid volume, and k is a coefficient. The change in IPV may be determined at least in part using an equation including: $dIPP = g[\rho \cdot \Delta h - h \cdot \Delta \rho]$, where g represents acceleration of gravity, $\rho$ represents density of dialysate solution, h represents a vertical distance between the pressure sensor and intraperitoneal fluid volume, and the change in IPV is inversely related to the change in IPP.

In general, in one aspect, one or more non-transitory computer-readable media store instructions that, when executed by one or more hardware processors, cause the one or more hardware processors to perform operations including: monitoring intraperitoneal volume (IPV) during a dwell period of a peritoneal dialysis patient, at least by monitoring intraperitoneal pressure (IPP) during the dwell period using a pressure sensor; and determining a change in IPV based at least on a change in IPP during the dwell period. The change in IPV may be determined at least in part using an equation including:

$$dIPV = -\frac{k}{g \cdot h} dIPP,$$

where g represents acceleration of gravity, h represents a vertical distance between the pressure sensor and intraperitoneal fluid volume, and k is a coefficient. The change in IPV may be determined at least in part using an equation including: $dIPP = g[\rho \cdot \Delta h - h \cdot \Delta \rho]$, where g represents acceleration of gravity, p represents density of dialysate solution, h represents a vertical distance between the pressure sensor and intraperitoneal fluid volume, and the change in IPV is inversely related to the change in IPP.

According to at least one aspect of this disclosure, there is provided a method for monitoring the intraperitoneal volume (IPV) of a fluid during a dwell phase of peritoneal dialysis treatment. In some examples, the method comprises: monitoring intraperitoneal pressure (IPP) of the fluid during the dwell period using a pressure sensor; measuring a volume and a weight of at least one sample of the fluid during the dwell period; determining a density of the fluid during the dwell period based on the volume and the weight of the at least one sample; and determining IPV based at least on a change in IPP and a change in the density during the dwell period.

In various examples, the IPV is determined at least in part based on an equation comprising:

$$IPV = V_0 \frac{IPP}{IPP_0} \cdot \frac{\rho_0}{\rho},$$

where $V_0$ is the volume of the fluid at a start of the dwell period, $IPP_0$ is intraperitoneal pressure at the start of the dwell period, $\rho_0$ is a known density of the fluid at the start of the dwell period, and $\rho$ is the density of the fluid during the dwell period. In some examples, determining the density of the fluid during the dwell period includes extracting at least one sample of the fluid from a peritoneal cavity of a patient, determining the volume of the at least one sample and a mass of the at least one sample, and returning the at least one sample to the peritoneal cavity. In many examples, extracting the at least one sample of the fluid is done automatically and the dwell period is ended when an ultrafiltration volume (UFV) reaches a target UFV, wherein the UFV is calculated by subtracting an initial fill volume of the fluid from the IPV. In various examples, the density is determined periodically. In many examples, determining the density periodically includes determining the density every 30 minutes. In various examples, the IPP is measured by measuring a pressure of the fluid in a peritoneal dialysis catheter. In some examples, the method further comprises compensating IPP and the density for variation in a temperature of the fluid.

According to at least one aspect of the present disclosure, a peritoneal dialysis cycler is provided. The peritoneal dialysis cycler may comprise a pressure sensor configured to measure an intraperitoneal pressure (IPP) of a fluid; a controller configured to: monitor an intraperitoneal volume (IPV) of the fluid during a dwell period of a patient by at least monitoring the IPP during the dwell period using the pressure sensor; determine a density of the fluid during the dwell period based on a volume and the weight of at least one sample of the fluid; and determine a change in the IPV based at least on a change in the IPP and a change in the density of the fluid during the dwell period.

In some examples, the controller is programmed to determine the IPV using an equation comprising:

$$IPV = V_0 \frac{IPP}{IPP_0} \cdot \frac{\rho_0}{\rho},$$

where $V_0$ is a volume of the fluid at a start of the dwell period, $IPP_0$ is an IPP at the start of the dwell period, $\rho_0$ is a known density of the fluid at the start of the dwell period, and $\rho$ is the density of the fluid during the dwell period. In various examples, determining the density of the fluid during the dwell period includes extracting the at least one sample from a peritoneal cavity of a patient, determining the volume of the at least one sample and a mass of the at least one sample, and then returning the at least one sample to the peritoneal cavity. In many examples, extracting the at least one sample of the fluid is done automatically and the dwell is ended when an ultrafiltration volume (UFV) reaches a target UFV, wherein the UFV is calculated by subtracting an initial fill volume of the fluid from the IPV. In some examples, the volume of the at least one sample is calculated based on a flow sensor measurement of the fluid being extracted from the peritoneal cavity and a mass of the fluid is determined using a scale that measures the weight of the at least one sample. In many examples, the peritoneal dialysis cycler further comprises a temperature sensor configured to measure the temperature of the fluid. In some examples, the controller compensates the pressure and the density based on a temperature of the fluid. In many examples, the controller is configured to determine the density periodically.

According to at least one aspect of the present disclose, a non-transitory computer-readable medium containing instructions thereon is provided, the instructions instructing one or more processors to perform operations comprising determining an intraperitoneal pressure (IPP) of the fluid during the dwell period using a pressure sensor; determining a change in the IPV based at least on a change in the IPP of the fluid during the dwell period; determining a density of the fluid during the dwell period based on a volume and a weight of at least one sample of the fluid; and determining an intraperitoneal volume (IPV) of the fluid based at least on a change in the IPP and a change in the density during the dwell period.

In some examples, the instructions further instruct the one or more processors to determine the IPV using an equation comprising $$IPV = V_0 \frac{IPP}{IPP_0} \cdot \frac{\rho_0}{\rho},$$

where $V_0$ is a volume of the fluid at a start of the dwell period, $IPP_0$ is an IPP at the start of the dwell period, $\rho_0$ is a known density of the fluid at the start of the dwell period, and $\rho$ is the density of the fluid during the dwell period. In various examples, the instructions further instruct the one or more processors to: extract at least one sample of the fluid from a peritoneal cavity of a patient; determine the volume of the at least one sample; determine a mass of the at least one sample; and return the at least one sample to the peritoneal cavity. In many examples, the instructions further instruct the one or more processors to compensate the density and the IPP based on a temperature of the fluid.

At least one aspect of the present disclosure provides a method for monitoring IPV of a fluid during a dwell period. In some examples, the method comprises determining an IPP of the fluid during the dwell period using a pressure sensor; determining a change in IPV based at least on a change in the IPP of the fluid during the dwell period; determining a density of the fluid during the dwell period based on a height of the fluid in the peritoneal cavity and a volume of the fluid; and determining an ultrafiltration volume (UFV) of the fluid during the dwell period based on the height. In some examples, the height is determined based the density and/or the volume.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals generally identify corresponding elements.

DETAILED DESCRIPTION

Traditionally in clinical practice for PD treatment, the total ultrafiltration volume (UFV) is determined from the difference in weight between total filling and draining volumes at the end of a PD treatment. However, the ultrafiltration volume changes throughout a dwell cycle. If the ultrafiltration volume could be monitored during a dwell cycle, more precise control of the ultrafiltration volume could be achieved. For example, a dwell cycle could be ended early or extended in order to achieve a target ultrafiltration volume.

One or more embodiments disclosed herein include components and techniques for predicting ultrafiltration volume (UFV) in peritoneal dialysis patients. Specifically, techniques are described herein for predicting UFV by monitoring intraperitoneal volume (IPV), intraperitoneal pressure (IPP), and/or dialysate density during a dwell cycle. UFV during the dwell may be calculated by difference between the IPV during the dwell and the initial fill volume of dialysate.

IPP is positively correlated with IPV during the filling of the dialysate into the peritoneal cavity. However, the relationship between IPP and UFV during the dwell cycle was not clear due to absent information from previous studies and the difficulty of performing continuous IPV and IPP monitoring during dwell. In a recent study discussed below, it was found that intraperitoneal volume (IPV) is associated with intraperitoneal pressure (IPP) during the peritoneal dwell cycle. An advantage of using IPP to monitor IPV is that IPP measurement can be monitored automatically and non-invasively through the dwell cycle without patient's activity.

Figure 1:
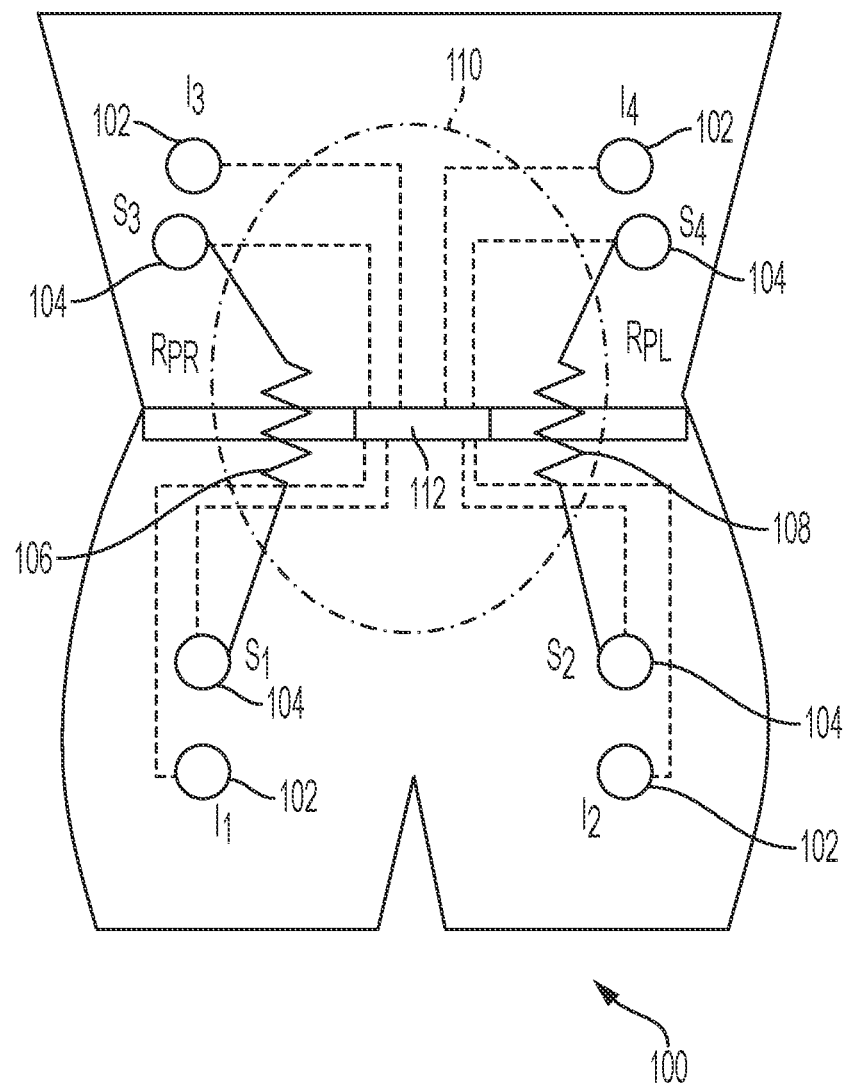
FIG. 1 illustrates an example of a segmental bioimpedance analysis system for monitoring intraperitoneal volume according to an embodiment.

For the study, intraperitoneal volume (IPV) was monitored during the dwell using segmental bioimpedance analysis (SBIA), which provided insights into UFV dynamics during the dwell cycle of a peritoneal dialysis (PD) treatment. The SBIA obtained continuous IPV data while IPP was monitored with sensors integrated in the PD Cycler. For the study, a multiple-bioimpedance device was used (e.g., Hydra 4200). FIG. 1 illustrates a schematic of the how measurement of fluid in the peritoneal cavity was done using eight-point electrodes placed on the patient's torso 100. The measurements of the torso 100 were made using a plurality of current electrodes 102, a plurality of measurement electrodes 104, a right resistance or impedance ($R_{PR}$) 106, a left resistance or impedance ($R_{PL}$) 108. Also illustrated in FIG. 1 is a peritoneal membrane 110 of a patient and a controller 112.

The controller 112 may be coupled to the current electrodes 102 and measurement electrodes 104. The measurement electrodes 104 may be coupled to the $R_{PR}$ 106 and/or the $R_{PL}$ 108. The measurement electrodes 104 positioned on the right side of the torso 100 may be coupled to the $R_{PR}$ 106, and the measurement electrodes 104 positioned on the left side of the torso 100 may be coupled to the $R_{PL}$ 108.

The controller 112, which may be or include, for example, the Hydra 4200 or similar device, may be configured to monitor the electrodes 102, 104 and resistances 106, 108 and receive information relating to current and resistance pertaining to said electrodes 102, 104 and resistances 106, 108. The controller 112 may be configured to calculate the resistances 106, 108 or fluid pressure and/or volume in the peritoneal cavity or relating to the peritoneal membrane 110. Although, as shown, the controller 112 is coupled to the torso 100 via a belt, the controller 112 need not be coupled to the torso 100. In some examples, the controller 112 may be a separate device that can stand alone.

In this example, $I_1$, $I_3$ and $I_2$, $I_4$ are current electrodes 102 and $S_1$, $S_3$ and $S_2$, $S_4$ are measuring electrodes 104 placed on the right and left sides, respectively. $R_{PR}$ 106 and $R_{PL}$ 108 are resistances at 5 kHz current frequency on the right and left sides of the abdominal area, respectively. The measuring electrodes 104 may sample at a frequency, for example, every two seconds during dialysate fill, dwell, and drain phases. Fluid volume in the peritoneal cavity was calculated using equation 1:

$$IPV = \frac{V_0}{\left(\frac{1}{R_F} - \frac{1}{R_E}\right) \cdot R_{PC}} \qquad \text{Eq. 1}$$

where $V_0$ is the volume of initial dialysate filling into the peritoneal cavity, $R_E$ is the resistance at the beginning when the peritoneal cavity is empty, $R_E$ is the resistance at the time when dialysate filling is completed, and $R_{PC}$ is the resistance measured after the filling phase and during dwell. The resistance of the peritoneal cavity was measured by one or more resistors, including the $R_{PR}$ and/or $R_{PL}$. Using Eq.1, IPV was continuously measured and calculated during the dwell cycle. Ultrafiltration volume was calculated by the difference between the maximum IPV during the dwell cycle and the volume of initial dialysate filling. Throughout the dwell cycle, IPP was monitored with sensors integrated in the PD Cycler.

Figure 2:
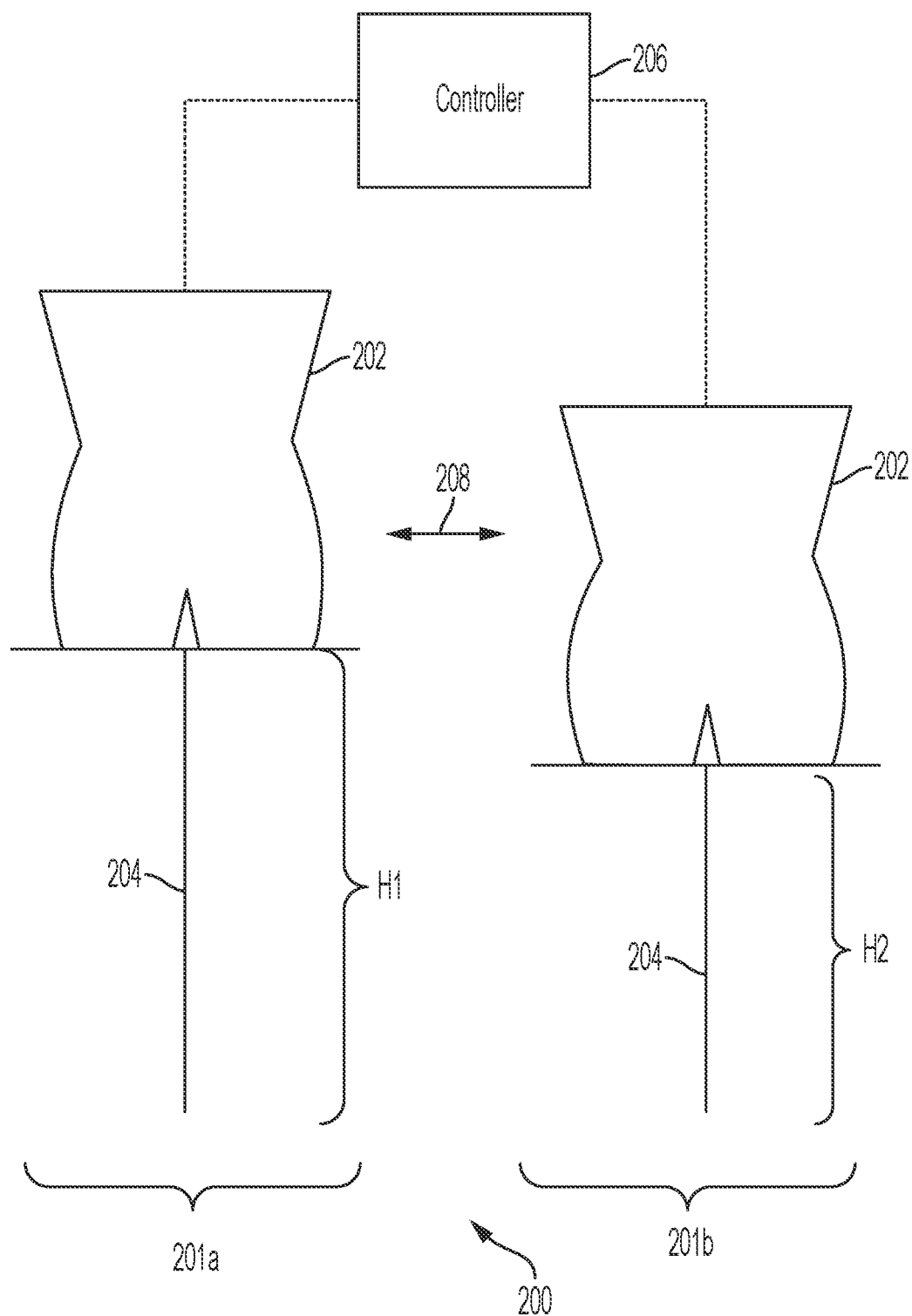
FIG. 2 illustrates a schematic of a bench experiment according to an embodiment.

To validate the IPP measurements from the sensors integrated into the Liberty cycler with software version 2.9.1C, a bench study was also conducted. FIG. 2 illustrates the schematic setup for the bench study 200 conducted to test the relationship between pressure changes and the height level. The bench study 200 included a PD simulator 202, an adjustable table 204 having at least a first height H1 and a second height H2, and a controller 206 (which, for the study, was a Liberty Cycler with software version 2.9.1C). The left side illustrates a first state 201a wherein H1 is greater than H2, and the right side illustrates a second state 201b wherein H2 is less than H1. An arrow 208 indicates the change from the first state 201a at height H1 of the PD simulator 202 and a the second state 201b at height H2 of the PD simulator 202

The PD simulator 202 was placed on the adjustable table 204. The adjustable table 204 could transition between various heights, including heights H1 and H2. The controller 206 was coupled to the PD simulator 202 and monitored and/or controlled the PD simulator 202, and collected IPP pressure measurements. The PD simulator 202 may be configured to simulate and/or emulate the peritoneal cavity, membrane, parietal peritoneum, visceral peritoneum, related capillaries, veins, and/or arteries, and so forth of the human body.

The principle of the relationship between the pressure of fluid volume, for example, the pressure of a fluid volume in the PD simulator 202, and the fluid's position in the vertical level can be described generally as:

$$P = \rho \cdot g \cdot h \qquad \text{Eq.2}$$

where P is the pressure from the fluid volume in the vertical direction, $\rho$ is the density of the fluid, g is the acceleration of gravity (g≈9.8 m/s$^2$), and h is the height (i.e., the vertical distance between the sensor and fluid volume). Therefore, P should correlate linearly with h when the height of fluid volume changes in the vertical direction.

In some examples, g and h are constants during the dwell phase of PD treatment. When g and h are constants, a change in the intraperitoneal pressure may be associated primarily with a change in the dialysate density $\rho$. An increase in IPV in the peritoneal cavity was found to be associated with a decrease in the density of the fluid volume in the peritoneal cavity of the PD simulator 202. The relationship of change in IPV (dIPV) with change in dialysate density can be generally presented by the following equation:

$$dIPV = -k \cdot d\rho \qquad \text{Eq.3}$$

where k is a coefficient that may relate to the degree of hydration and the characteristics of the peritoneal membrane in individual patients, and $d\rho$ is the change in dialysate density in the peritoneal cavity during dwell. From Eq.2 and Eq.3, the relationship between individual IPV and pressure IPP can be described as follows:

$$dIPP = g \cdot h \cdot d\rho \qquad \text{Eq.4}$$

The combination of Eq.3 and Eq.4 applies to the relationship between the change in pressure and IPV as follows:

$$dIPV = -\frac{k}{g \cdot h} dIPP \qquad \text{Eq. 5}$$

$$\Delta IPV = \int_{P1}^{P2} \frac{k}{g \cdot h} dIPP = -\frac{k}{g \cdot h} \Delta IPP \qquad \text{Eq. 6}$$

Eq.6 shows that a change in peritoneal volume is inversely correlated with a change in intraperitoneal pressure during dwell. Since UFV of a PD treatment is defined as the change in IPV during dwell, the same relationship between ΔUFV and ΔIPP applies during dwell as shown in Eq.6.

In general, in a closed space such as the empty peritoneal cavity free of fluid, such as an empty peritoneal cavity of the PD simulator 202, the pressure is expressed in P⁰. When the density (ρ) of dialysate solution is filled into the peritoneal cavity, the total pressure can be presented as follows:

$$P_{total} = P_0 + (\rho \cdot g \cdot h) \qquad \text{Eq. 7}$$

where $P_0$ represents the initial pressure before fresh dialysate is filled into the peritoneal cavity. $P_0$ may depend on the degree of transcapillary hydrostatic pressure and the characteristics of the peritoneal membrane (for example, peritoneal membrane 110). In this case, since ρ is a constant during filling phase, $P_{total}$ is determined by two factors: initial pressure ($P_0$) and dialysate height (h). During the filling phase, over 2 liters (L) of fresh dialysate solution is filled into the peritoneal cavity to increase the dialysate height. Therefore, $P_{total}$ may increase with an increase in the dialysate height in the peritoneal cavity. Variability of $P_{total}$ with dialysate height may be based on or related to the difference in initial pressure (P⁰) of the peritoneal cavity in individual patients. In addition, after the filling phase and at the beginning of the dwell phase, excess fluid may start to shift from the capillary to the peritoneal cavity by a high gradient of hydrostatic pressure via the surface area of dialysate in the peritoneal cavity. Since some of the excess fluid may shift into the peritoneal cavity by ultrafiltration (UF) during dwell, the dialysate is diluted and its density decreases so that IPP inversely correlates with UFV (Eq.6).

The goal of the bench study was to evaluate the relationship between pressure and the height of dialysate (Eq.2). For the bench study, the PD simulator 202 was filled with 2 L of 2.5% glucose dialysate. The height of simulator was gradually increased by steps of 2.5 inches, until reaching the top point (36 inches). The top height may, in some examples, correspond to the first state 201a. The height then decreased from the top point back to the baseline height over 2 hours. The baseline height may correspond, in some example, to the second state 201b. Pressure was measured automatically by the controller 206.

Figure 3B:
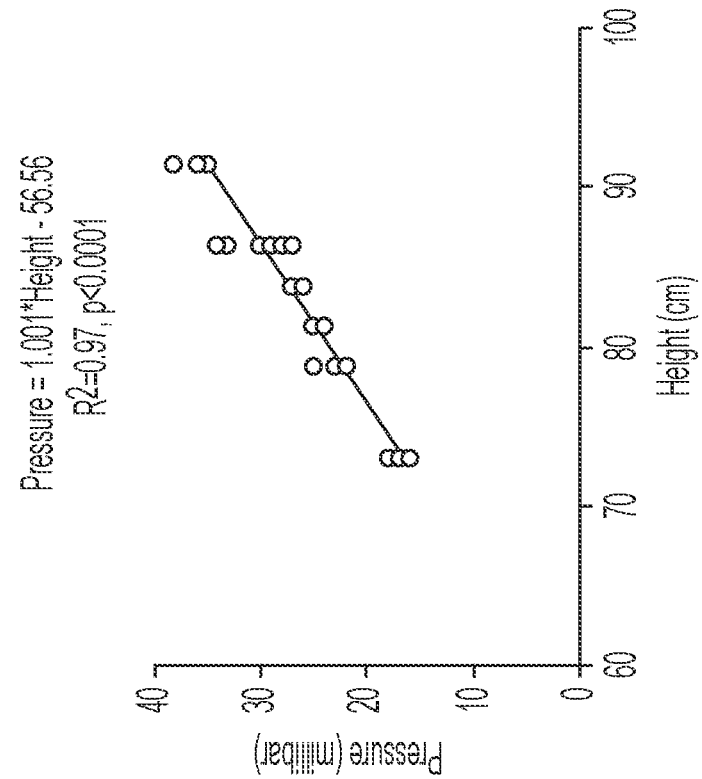
FIG. 3B illustrates a plot of pressure vs. height during a bench experiment according to an embodiment.
Figure 3A:
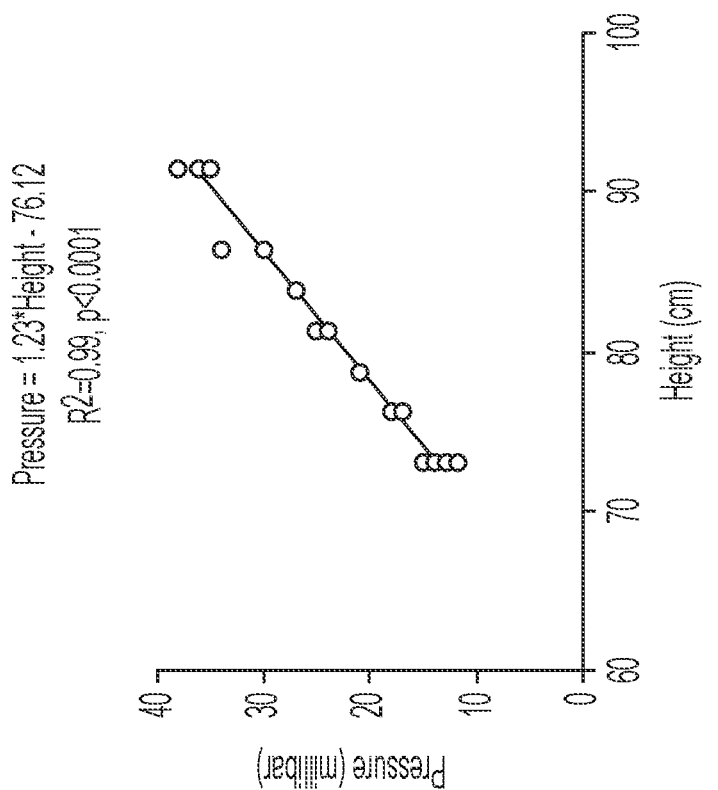
FIG. 3A illustrates a plot of pressure vs. height during a bench experiment according to an embodiment.

The bench study 200 included two phases of change in height: phase (a), in which the height increased from baseline to the top point (for example, from the second state 201b to the first state 201a); and phase (b), wherein height decreased from the top point to the baseline (for example, from the first state 201a to the second state 201b). FIGS. 3A and 3B illustrate the relationship between changes in the height of the PD simulator 202 on the adjustable table 204 and changes in pressure measured by the controller 206 for the respective phases (a) and (b). As shown in FIGS. 3A and 3B, pressure measured by the controller 206 was highly correlated with height in both phases (a) and (b). The bench study 200 demonstrates that changes in the pressure of a PD catheter can be precisely measured with a pressure sensor, for example, a pressure sensor coupled to the controller 206.

With validation of the IPP measurements using the sensors integrated into the Liberty cycler with software version 2.9.1C, a clinical pilot study was conducted with 14 measurements in 12 PD patients (age 59.4±14.3 year, 4 females, pre weight 83±28 kg, BMI 28.6±7.8 kg/m2, PD vintage 13.3±7 month) who were studied during a 2-hour dwell (2 L dialysate, 2.5% dextrose). IPP was measured every 15 seconds, using pressure sensors integrated in the controller 206 (Liberty cycler with software version 2.9.1C). Three techniques were used to quantize UFV: (1) weighing of drain fluid ($UFV_{Drain}$); (2) by the Liberty Cycler ($UFV_{Liberty}$, ml); and (3) by SBIA ($UFV_{SBIA}$, ml). Average UFV in all patients was 199.1±193.2 ml, 218.8±136.4 ml and 266.9±136.4 g with $UFV_{SBIA}$, $UFV_{Liberty}$ and $UFV_{Drain}$ respectively. In the entire group, $UFV_{Liberty}$ (218.6±156.6 ml) and $UFV_{SBIA}$ (198.1±215.6 ml) were lower than $UFV_{Drain}$ (265.6±150.3 g). Comparing IPV and IPP every 10 minutes, correlation of IPV and IPP was found in 8 patients with UFV>200 ml.

Figure 4A:
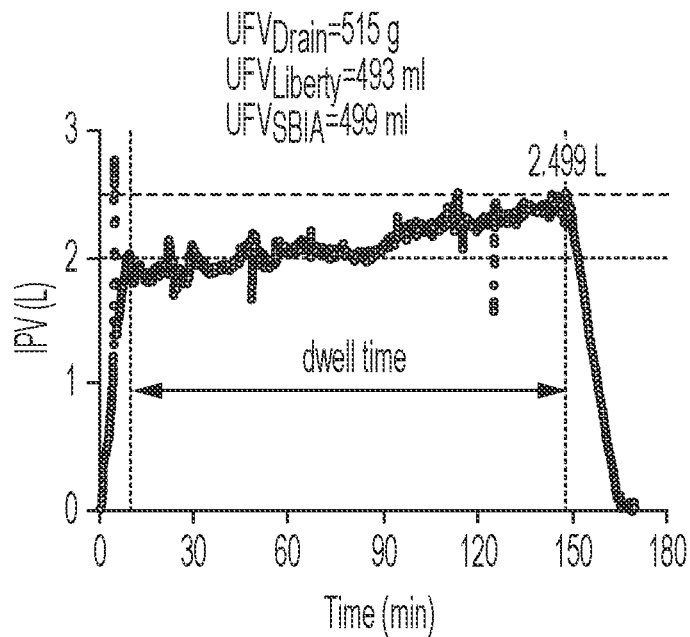
FIG. 4A illustrates a plot of intraperitoneal volume (IPV) vs. time in a patient during dwell according to an embodiment.
Figure 4B:
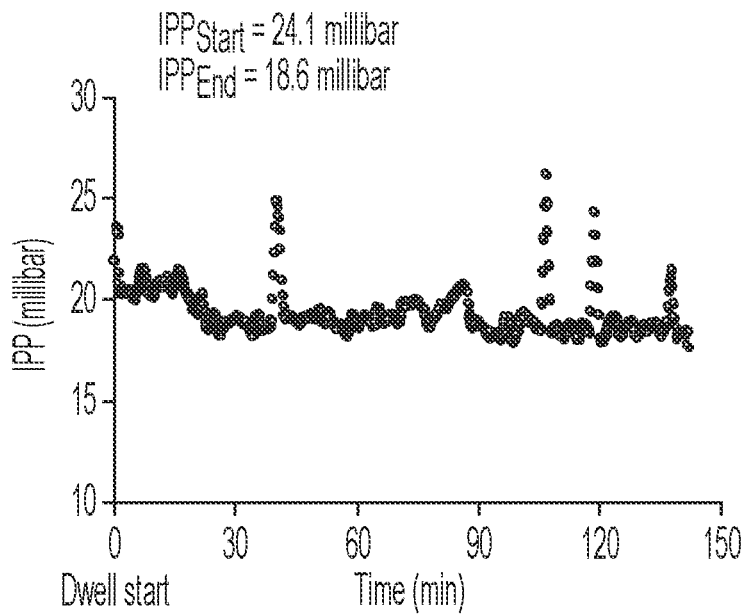
FIG. 4B illustrates a plot of intraperitoneal pressure (IPP) vs. time in a patient during dwell according to an embodiment.
Figure 5A:
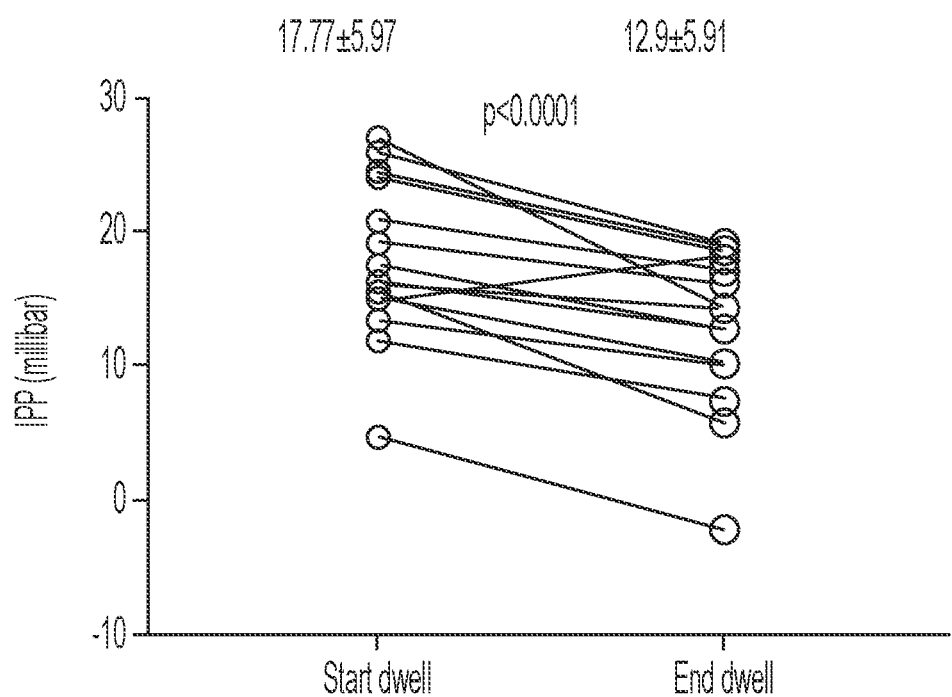
FIG. 5A illustrates a plot of change in IPP from the start of dwell to the end of dwell according to an embodiment.
Figure 5B:
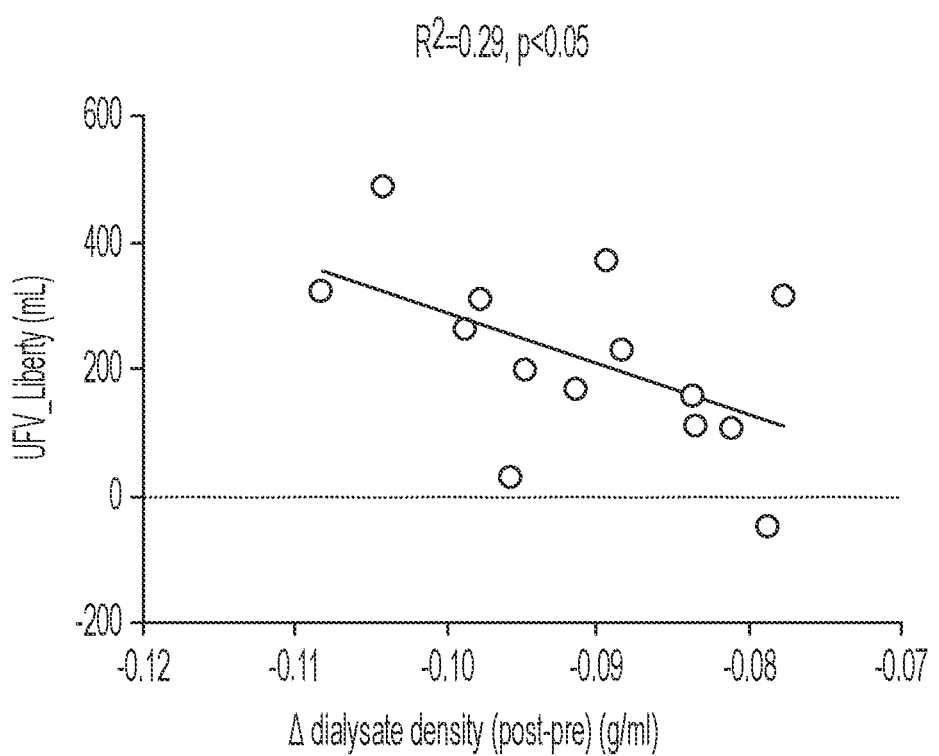
FIG. 5B illustrates a plot of UFV measured by a controller (e.g., a Liberty Cycler) vs. dialysate density for 12 individual patients in 14 measurements according to an embodiment.

FIGS. 4A through 8C illustrate the results from the bench study 200 and clinical pilot study. As shown in FIG. 4A, IPV increased by 0.499 L (UFV) during dwell. As shown in FIG. 4B, IPP decreased, from 24.1 millibar to 18.6 millibar in the same period of time. FIG. 5A illustrates how IPP decreased from the start of dwell to the end of dwell in the patients from the clinical study. FIG. 5B illustrates how changes in dialysate density is correlated with UFV in the patients from the clinical pilot study.

Figure 6A:
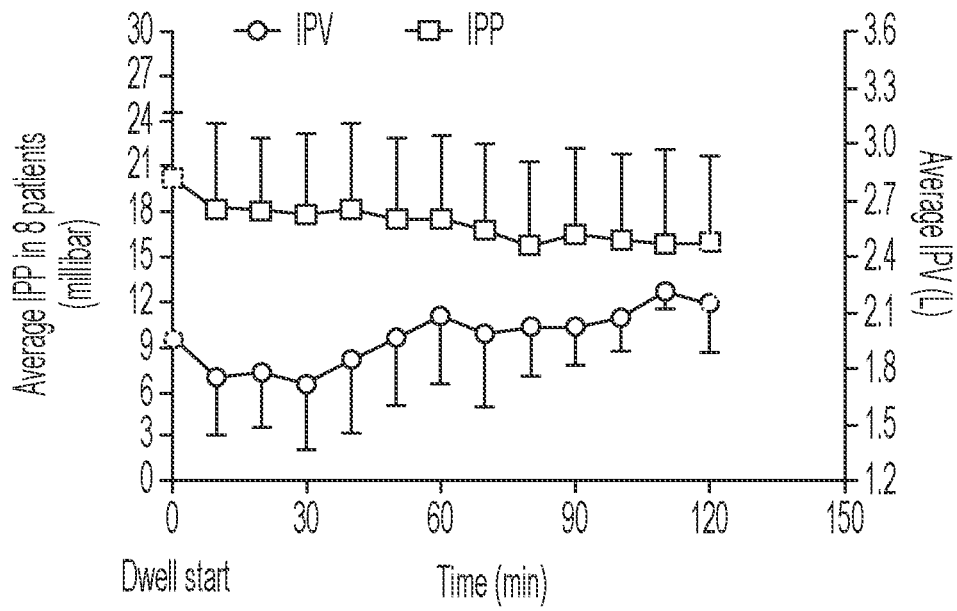
FIG. 6A illustrates a plot of IPP and IPV vs. time in 8 patients during dwell according to an embodiment.
Figure 6B:
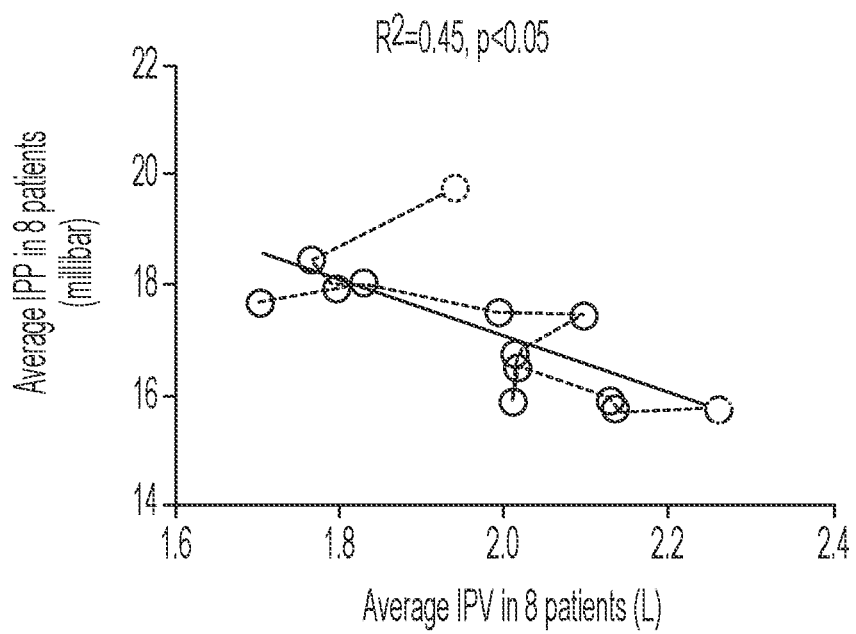
FIG. 6B illustrates a plot of average IPP vs. average IPV in 8 patients according to an embodiment.

FIG. 6A illustrates average IPV and IPP in eight patients during dwell, showing increases in IPV (circle) and decreases in IPP (square). FIG. 6B illustrates a relationship between IPV and IPP during dwell in 8 patients. In this example, each circle represents the relationship between changes in IPP and IPV at different times of the dwell for the same patient. The dashed lines connect two consecutive points with the time order. As FIG. 6B shows, IPP tends to fall over time as IPV increases, and the change over time tends to be linear.

Figure 7A:
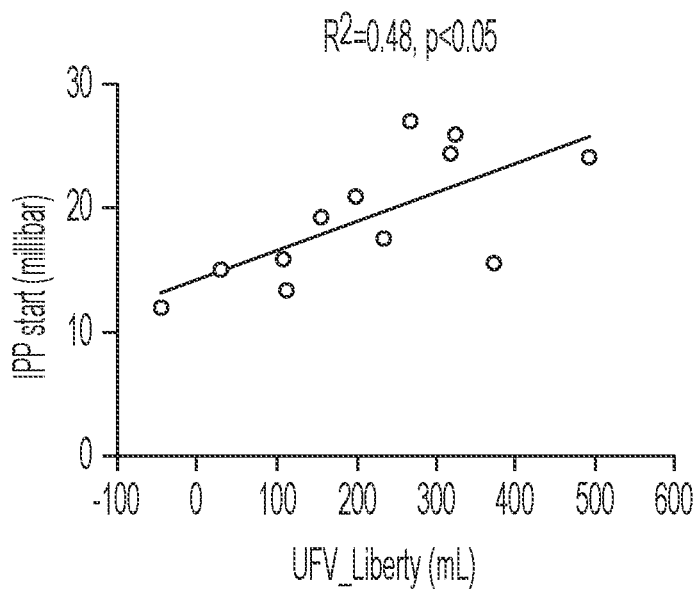
FIG. 7A illustrates a plot of IPP at start of dwell vs. UFV measured by a Liberty Cycler ($UFV_{Liberty}$) according to an embodiment.
Figure 7B:
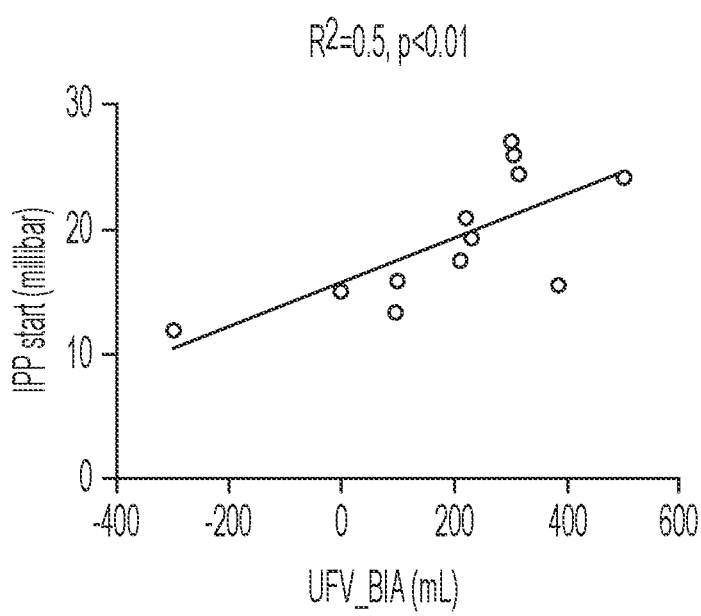
FIG. 7B illustrates a plot of IPP at start of dwell vs. UFV measured by segmental bioimpedance analysis ($UFV_{SBIA}$ or $UFV_{BIA}A$) according to an embodiment.

FIGS. 7A and 7B illustrate where IPP at the start of the dwell ($IPP_{Start}$) was associated with $UFV_{Liberty}$ and $UFV_{SBIA}$ (shown in FIG. 7A as $UFV_{BIA}$). These results indicate that the IPP value at the start of the dwell can be used to predict UFV. In a study designed to provide the same dwell time for all patients, the correlation between $IPP_{Start}$ and UFV is approximately equivalent to the correlation between $IPP_{Start}$ and ultrafiltration rate (UFR). Assuming that PD UFR may relate to fluid transport across the peritoneal membrane, $IPP_{Start}$ may be a valuable parameter for understanding the characteristics of the peritoneal membrane in individual patients (Eq.7). FIG. 7A shows the relationship between IPP ($IPP_{Start}$), measured at the start of dwell, and UFV by the Liberty cycler. The treatment time was the same for all patients so that the different UFV corresponds to each individual UFR which may reflect individual membrane characteristics of the respective membranes of each patient.

When IPV increases, the density of the dialysate decreases depending on the amount of water shifted through the membrane, which dilutes the dialysate in the peritoneal cavity. Per Eq.2 above, $$P = \rho \cdot g \cdot h \qquad \text{Eq.2 (restated)}$$

where P is the pressure of a specific fluid, ρ is fluid density, g is acceleration of gravity, and h is the height of the fluid. If g and h are constant, the pressure may decrease when density decreases. The bench study 200 described above confirms this relationship. However, if the height (h) is not constant, pressure must be calculated using at least two variables (for example, h and ρ). The following discussion demonstrates techniques for determining pressure using at least two variables, and describes the results of a bench study that corroborates the relationship between the pressure, height and volume.

From Eq.1, a derivative equation may be obtained: where $$\frac{\partial P}{\partial t} = g \cdot h \cdot \frac{\partial \rho}{\partial t} + \rho \cdot g \cdot \frac{\partial h}{\partial t} \qquad \text{Eq. 8}$$

$$\frac{\partial P}{\partial t}$$

represents pressure change as a function of time, and $$\frac{\partial \rho}{\partial t} \text{ and } \frac{\partial h}{\partial t}$$

represent changes in the density and height of the dialysate solution, respectively. This example assumes that the change in density (the difference between post and pre dialysate density: $\Delta\rho$=post-dialysate $\rho$−pre-dialysate $\rho$) of dialysate is <0, because the post-dialysate density usually decreases as ultrafiltration volume (UFV) increases. If UFV equals 0, then post-dialysate $\rho$ equals pre-dialysate $\rho$. Therefore, Eq.8 may be rewritten as:

$$\Delta P = g[\rho \cdot \Delta h - h \Delta \rho] \quad \text{Eq.9}$$

where $\Delta P$, $\Delta h$, and $\Delta \rho$ respectively represent the change in pressure, change in height, and change in density. From Eq.9, it can be concluded that pressure change (increase and/or decrease) is associated with the height of a solution, if the density is constant ($\Delta\rho$=0), and that if the height is constant, the change in pressure is dependent on the change in density $\Delta\rho$. Since $\Delta\rho$ is inversely correlated with UFV, a change in pressure negatively correlates with UFV. It also follows that if $\rho \cdot \Delta h = h \cdot \Delta\rho$, the pressure will remain constant.

Figure 11:
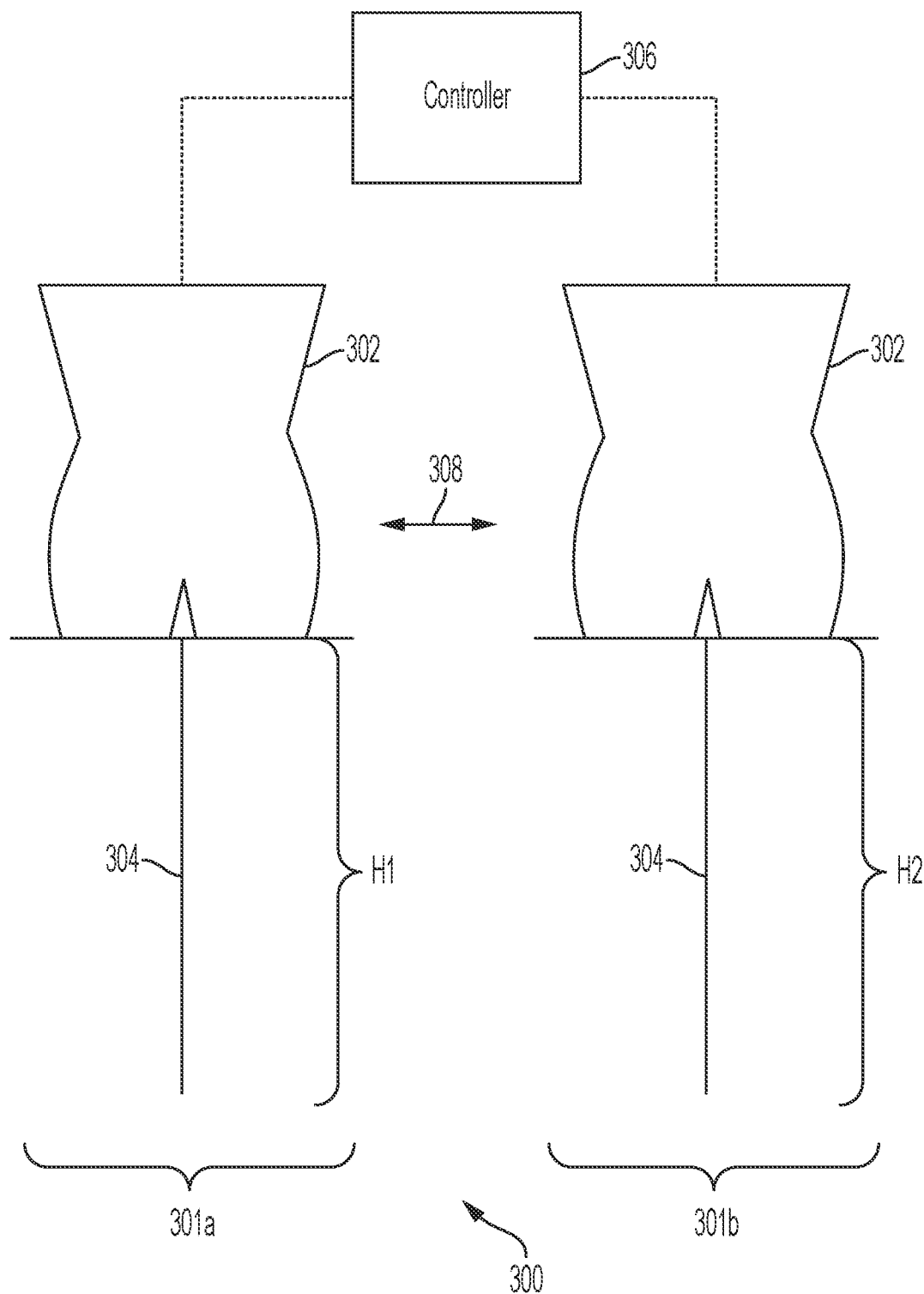
FIG. 11 illustrates a schematic of another bench experiment according to an embodiment.

FIG. 11 illustrates another bench study 300 that was conducted. Bench study 300 demonstrated that the change in IPP depends on the change in the IPV. The bench study 300 includes a PD simulator 302, an adjustable table 304, and a controller 306. The controller 306 included a Liberty Cycler with software version 2.9.3. The height of the adjustable table 304 was left unchanged during the duration of the experiment, such that for any two states 301a, 301b the heights of each state H1, H2 are equal. The arrow 308 represents the change from the first state 301a to the second state 301b.

The controller 306 measured IPP using sensors (for example, pressure sensors and/or electrodes such as electrodes 102, 104). The PD simulator 302 was used to fill a known dialysate solution (2000 mL). The experiment included three phases: (1) filling phase— 2 L dialysate was filled into the simulator within 10 minutes; (2) dwell phase for 25 minutes; and (3) draining phase for about 10 minutes.

Figure 12:
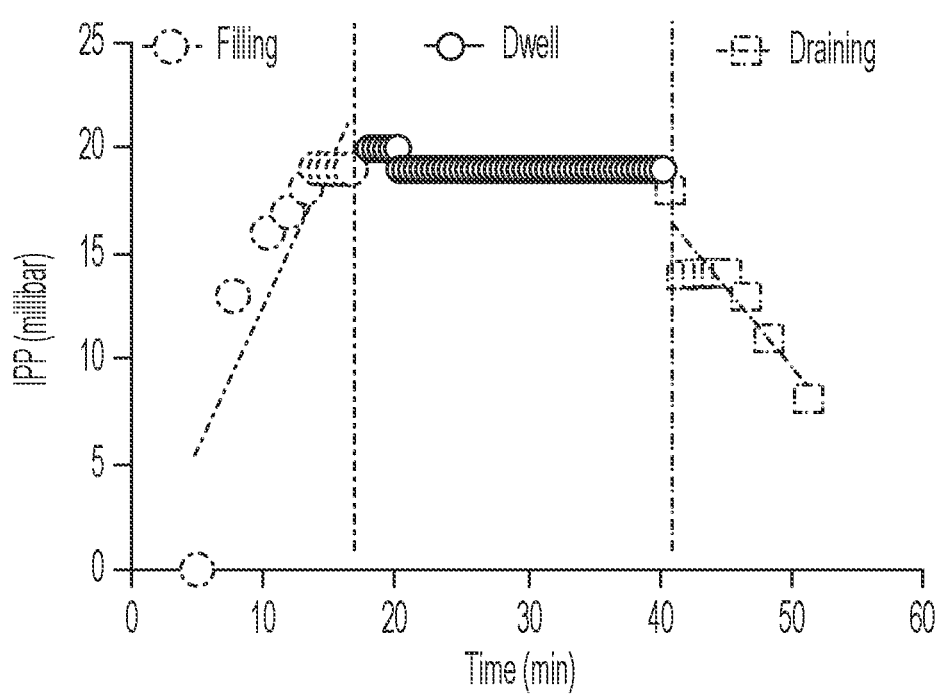
FIG. 12 illustrates a plot of results of the bench experiment of FIG. 11 according to an embodiment.

FIG. 12 is a plot of results of the bench study 300. FIG. 12 illustrates changes in pressure during filling and draining of the PD simulator 302 during the bench study 300. FIG. 12 shows that the increase and decrease in IPP are due to the volume filled (filling) and removed (draining) to or from the PD simulator 302. It will be appreciated that there is no change in the volume or height of the PD simulator 302 during dwell, so the pressure of fluid within the PD simulator 302 should otherwise remain constant. Accordingly, the bench study 300 provides evidence that the relationship between IPV and IPP can be expressed using piecewise functions that depend on at least two independent variables: density and height of the solution.

The discussion above explains the relationship between IPV and IPP during dwell time. The above discussion shows that ultrafiltration volume may be monitored with IPP measurements during peritoneal dialysis treatment. Since IPP measurements can be performed automatically with integrated sensors in a PD machine (such as the controllers 112, 206, 306, or devices such as the Liberty Cycler or similar devices), there is little or no additional cost or time compared to the method of using bioimpedance. In addition, the correlation between $IPP_{Start}$ and UFV implies that IPP measured at the start of dwell may be associated with characteristics of the peritoneal membrane. This finding may allow for obtaining objective and quantitative information about the peritoneal membrane transport characteristics. Moreover, the discovery of the relationship between a change in dialysate density and UFV during dwell provides an additional opportunity to understand the dynamics of chemical substances transport across the membrane. Furthermore, it will be appreciated that the many electrodes of the SBIA method are not necessary used in the pressure sensor method, thus making the present method easier to administer at home compared to existing methods.

It will be appreciated from the foregoing that IPV may be predicted based on IPP during fill, dwell, and drain phases. IPV may be predicted based on IPP because, in some examples, IPV is linearly related to IPP. As a result, dialysis and dialysis-related treatments may use IPP to predict IPV over time through fill, dwell, and drain phases, and may adjust treatment based on the predictions and pressure values obtained. Predicting IPV based on IPP eliminates the need for electrodes, such as those that would be used in SBIA or using other methods.

Although IPP can be measured quasi-continuously and noninvasively by a pressure sensor, such as a pressure sensor within a PD Cycler or placed on a PD catheter, accuracy of using IPP to calculate IPV and predict UFV may be affected by changes in dialysate density which results in the change of IPV. Per Eq.2 above:

$$IPP = \rho \cdot g \cdot h \quad \text{Eq.2 (restated)}$$

where $\rho$ is dialysate density, g is acceleration of gravity, and h is the height of the PD dialysate in the peritoneal cavity above the measurement point. The acceleration of gravity g is the same globally, so the changes in h and $\rho$ are the factors driving IPP changes. In the clinical studies discussed above, it was demonstrated that a decrease in density $\rho$, was due to movement of water into the peritoneal cavity and uptake of glucose from the peritoneal cavity into the patient. Knowledge of density $\rho$ and IPP during dwell may enable a calculation of h (a metric related to IPV) by solving Eq. 2 for h:

$$h = \frac{IPP}{\rho \cdot g} \quad \text{Eq. 10}$$

Since the volume (V) can be calculated with the cross-sectional area (A) multiply by height h, Eq. 2 can be presented as:

$$\frac{V}{A} = \frac{IPP}{\rho \cdot g} \quad \text{Eq. 11}$$

where V represents intraperitoneal volume IPV and A represents cross-sectional area of dialysate in peritoneal cavity. If we assume that A is a constant value, $A_0$, Eq. 11 can be rewritten as follows:

$$IPV = \frac{A_0}{g} \cdot \frac{IPP}{\rho} \quad \text{Eq. 12}$$

where $A_0$ can be calculated based on the initial infused volume ($V_0$) and density ($\rho_0$) of fresh dialysate and the initial pressure ($IPP_0$) when dialysate is filled:

$$A_0 = \frac{V_0 \cdot \rho_0}{IPP_0} g \qquad \text{Eq. 13}$$

so that Eq. 12 can be presented as follows:

$$IPV = V_0 \frac{IPP}{IPP_0} \cdot \frac{\rho_0}{\rho} \qquad \text{Eq. 14}$$

where $V_0$ is the volume of the fresh dialysate initially filled into peritoneal cavity, $IPP_0$ can be measured at the end of the filling procedure, e.g., with the Liberty PD Cycler, and $\rho_0$ is a known density of fresh dialysate. According to Eq. 14, IPV can be calculated at any time during dwell time if IPP and the density of dialysate are known. As discussed herein, IPP can be continuously measured by Liberty cycler. Therefore, if dialysate density during the dwell can be measured, IPV can be more accurately calculated according to Eq. 14 during the dwell in PD patients by accounting for changes in the density of the dialysate during the dwell.

Figure 8A:
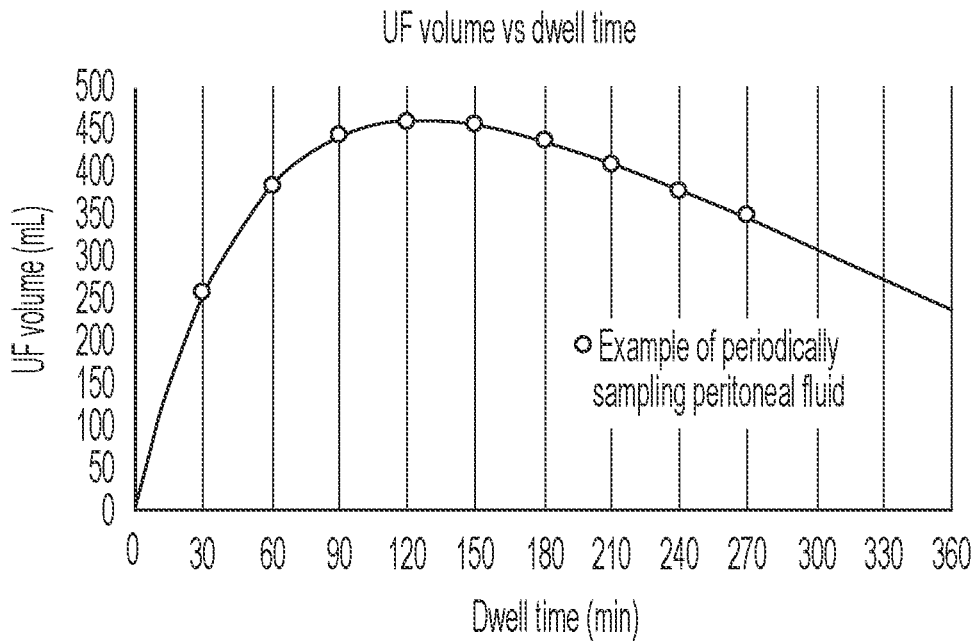
FIG. 8A illustrates a plot of UFV vs dwell time according to an embodiment.

According to another embodiment, a method of PD treatment may include monitoring IPP and dialysate density (periodically) during the dwell of a PD treatment. For example, a PD cycler or PD treatment system may be configured to periodically pump out during the dwell cycle a sample of dialysate out of the peritoneal cavity for density measurement and then return the dialysate sample back to the peritoneal cavity. For example, the PD Cycler may be programmed to remove and return a dialysate sample for density measurement every 30 minutes during the dwell. FIG. 8A is a chart of UF volume vs time during a dwell, and identified in FIG. 8A are example points at which periodic sampling and density measurement of the dialysate fluid could be automatically performed by the PD cycler or PD system. FIG. 8A shows that UFV initially increases at a fairly rapid rate—for example, increasing from 0 mL to approximately 450 mL over 120 minutes—and then UFV decreases at a slower, steady rate—for example, from 450 mL to approximately 350 mL over 150 minutes.

Figure 8B:
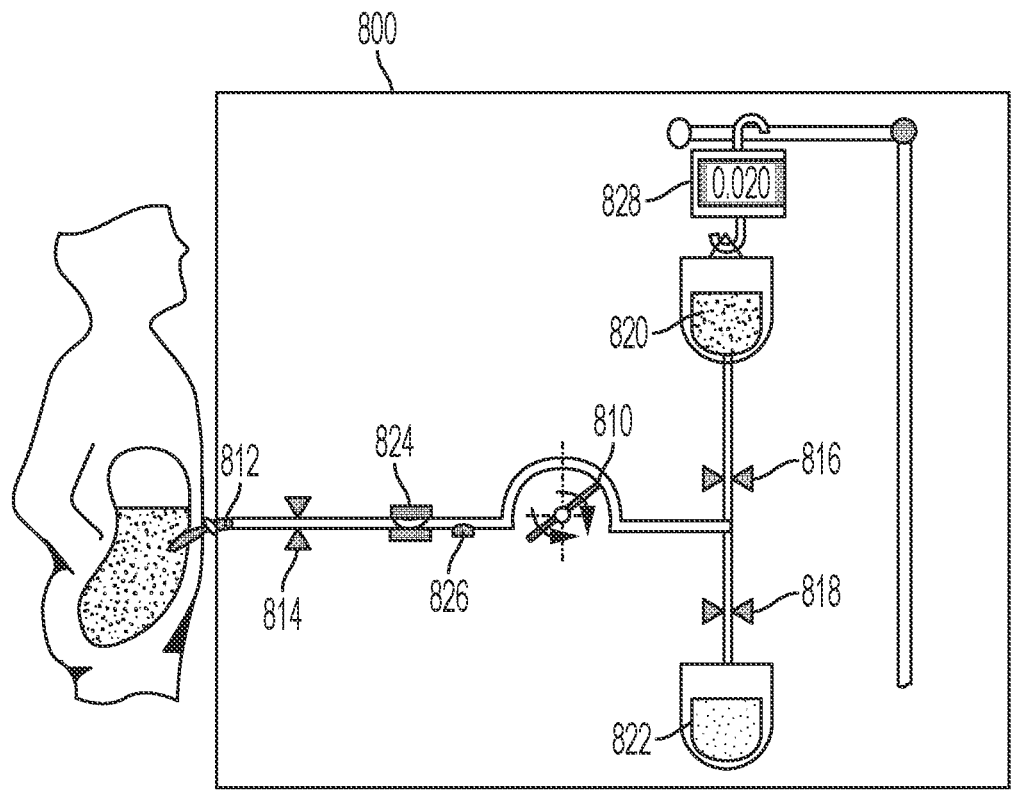
FIG. 8B illustrates a schematic of a PD system according to an embodiment.

FIG. 8B shows a schematic of a PD system 800, according to another embodiment. The PD system 800 may be can perform PD treatment and the PD system 800 can automatically sample and measure the density of the dialysate fluid periodically during the dwell phase. The PD system 800 includes a PD cycler 810 fluidly connected to a PD patient catheter 812, a series of valves 814, 816, 818. The valves 814, 816, 816 are configured to control dialysate flow in and out of catheter 812, as well as opening and/or closing of the fresh dialysate bag 820, and opening and/or closing of the drainage bag 822. The PD cycler 810 may include a pressure senor (not shown) configured to measure the pressure of the fluid within catheter 812. The PD system 800 further includes a flow sensor 824 configured and positioned to measure the flow and volume of dialysate flowing into or out of the peritoneal cavity of the patient. In some embodiments, the PD system 800 includes a temperature sensor 826 configured to measure dialysate temperature as well as the ambient temperature. In some examples, the PD Cycler 810 controls the direction and time of the dialysate flow into or out of the peritoneal cavity. The PD system 800 uses a fresh dialysate bag 820 to accommodate dialysate samples temporarily during the dwell cycle. The PD system 800 may further include a dialysate density measurement mechanism. For example, as shown in FIG. 8B, PD system 800 may include a scale 828 configured to measure the weight of the dialysate samples when temporarily stored in fresh dialysate bag 820. In some embodiments, one or more of the components of PD system 800 may be integrated into the PD cycler 810. For example, in some embodiments, valves 814, 816, 818, flow sensor 824, temperature sensor 826, and/or scale 820 are integrated into the PD cycler 810.

The PD system 800 can periodically measure the dialysate density by pumping a small dialysate sample from the patient's peritoneal cavity through the flow sensor 824 into the fresh dialysate bag 820. The flow measurement from the flow sensor 824 can be used to calculate the total volume of the dialysate sample and an output from the scale 828 can be used to calculate the mass of the dialysate sample. The density $\rho$ of the dialysate sample can then be calculated by dividing the dialysate sample's mass by the dialysate sample's volume. The sampling frequency and dialysate density measurement is an adjustable parameter. For example, taking a dialysate sample to determine the density of the dialysate sample may be performed continuously or at intervals such as every 10 minutes, 15 minutes, 20 minutes, 25 minutes, 30 minutes, or more. In some embodiments, the PD system 800 is programmed to compensate the density and/or pressure measurement for temperature variation. Temperature variation may be monitored by the temperature sensor 826. In some embodiments, the PD system 800 is programmed to calculate IPV according to Eq. 13 after each dialysate sampling density calculation, and monitor the IPV throughout the dwell cycle. Once a target ultrafiltration volume is achieved, the dwell cycle is ended.

Figure 8C:
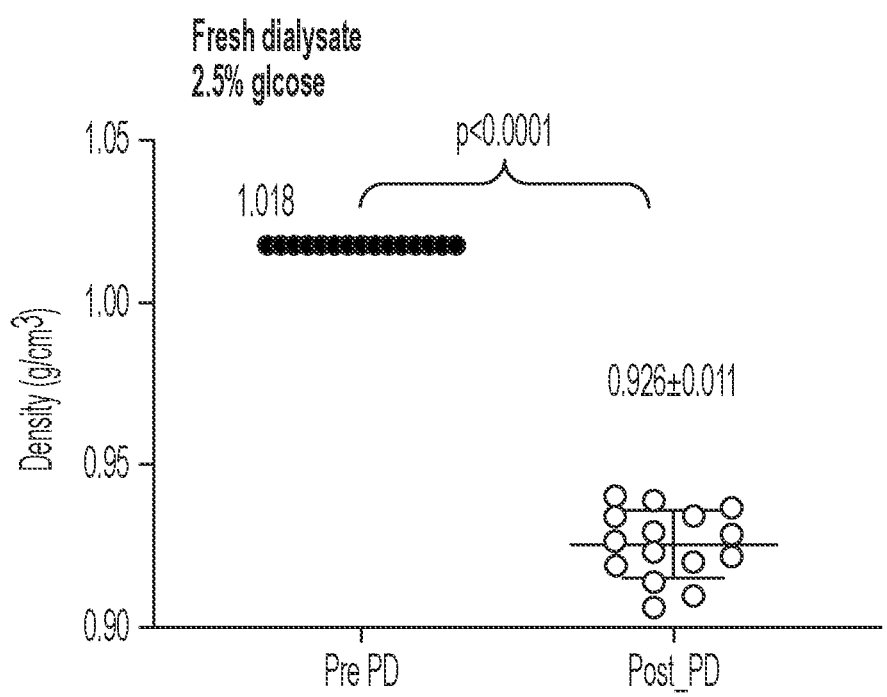
FIG. 8C illustrates a plot of dialysate density pre and post dwell according to an embodiment.

FIG. 8C is a chart showing the change in dialysate density at the start of a dwell and at the end of a dwell for 13 patients. The density decreased (p<0.0001) from 1.018 (g/ml) with fresh 2.5% glucose dialysate to average 0.9256±0.0106 (g/ml).

In some examples, systems and methods described herein provide for monitoring changes in IPV and/or IPP based on changes in density of dialysate. In some examples, systems and methods described herein provide for predicting ultrafiltration rate (UFR) or ultrafiltration volume (UFV) based on IPP and/or density of the dialysate. Systems and methods described herein may be used to provide more effective PD treatments based on calculations of IPV, IPP, UFR, and/or UFV, without requiring additional equipment that would be impractical for at-home PD patients.

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 9:
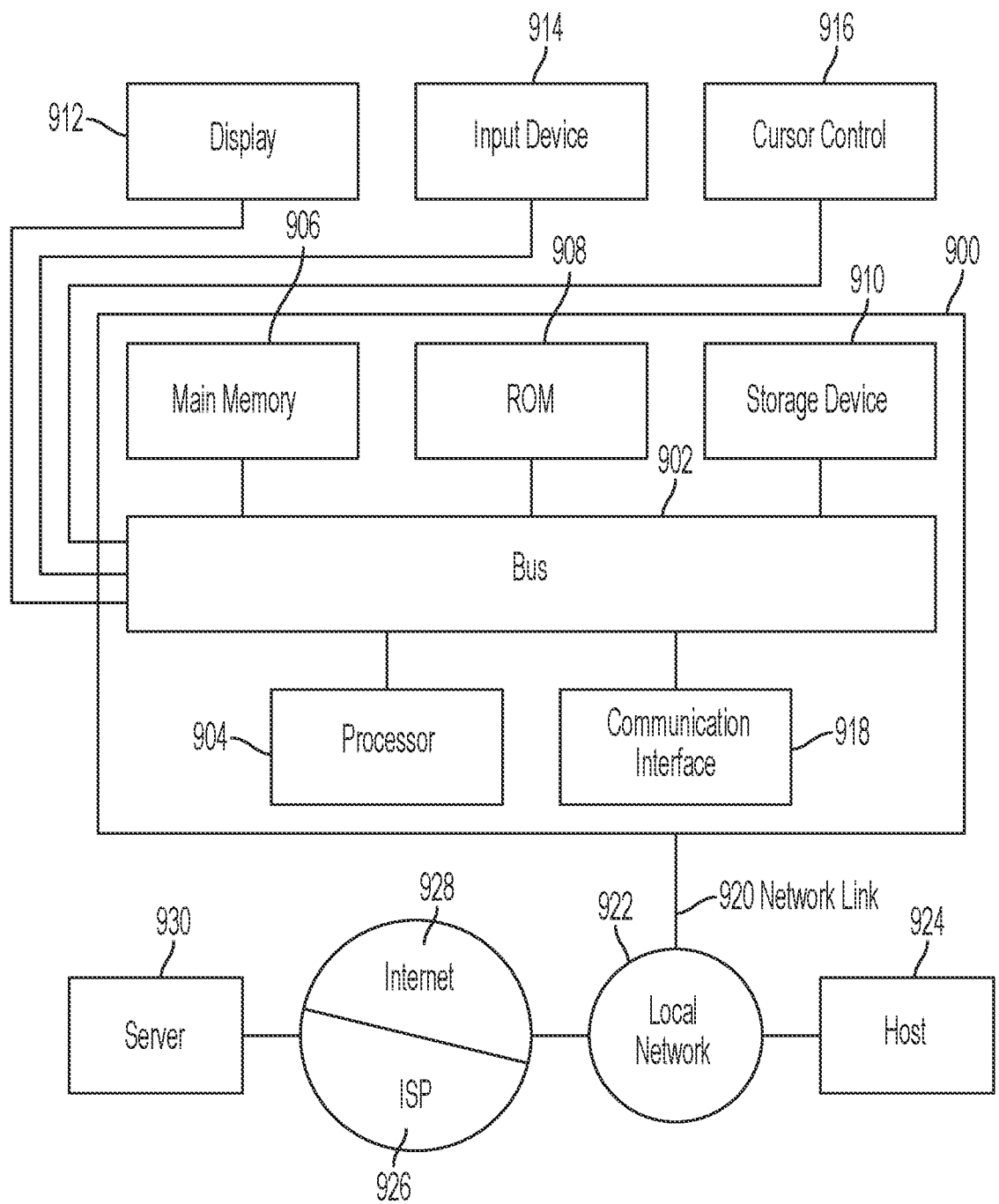
FIG. 9 illustrates a block diagram of an example of a computer system according to an embodiment.

For example, FIG. 9 is a block diagram of an example of a computer system 900 according to an embodiment. Computer system 900 includes a bus 902 or other communication mechanism for communicating information, and a hardware processor 904 coupled with the bus 902 for processing information. Hardware processor 904 may be a general-purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in one or more non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a liquid crystal display (LCD), plasma display, electronic ink display, cathode ray tube (CRT) monitor, or any other kind of device for displaying information to a computer user. An input device 914, including alphanumeric and other keys, may be coupled to bus 902 for communicating information and command selections to processor 904. Alternatively or additionally, computer system 900 may receive user input via a cursor control 916, such as a mouse, a trackball, a trackpad, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. Alternatively or additionally, computer system 9 may include a touchscreen. Display 912 may be configured to receive user input via one or more pressure-sensitive sensors, multi-touch sensors, and/or gesture sensors. Alternatively or additionally, computer system 900 may receive user input via a microphone, video camera, and/or some other kind of user input device (not shown).

Computer system 900 may implement the techniques described herein using customized hard-wired logic, one or more ASICs or FPGAs, firmware, and/or program logic which in combination with other components of computer system 900 causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 902. Transmission media may also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 900 may receive the data from the network and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922, and communication interface 918.

The received code may be executed by processor 904 as it is received, and/or stored in storage device 910, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

Figure 10:
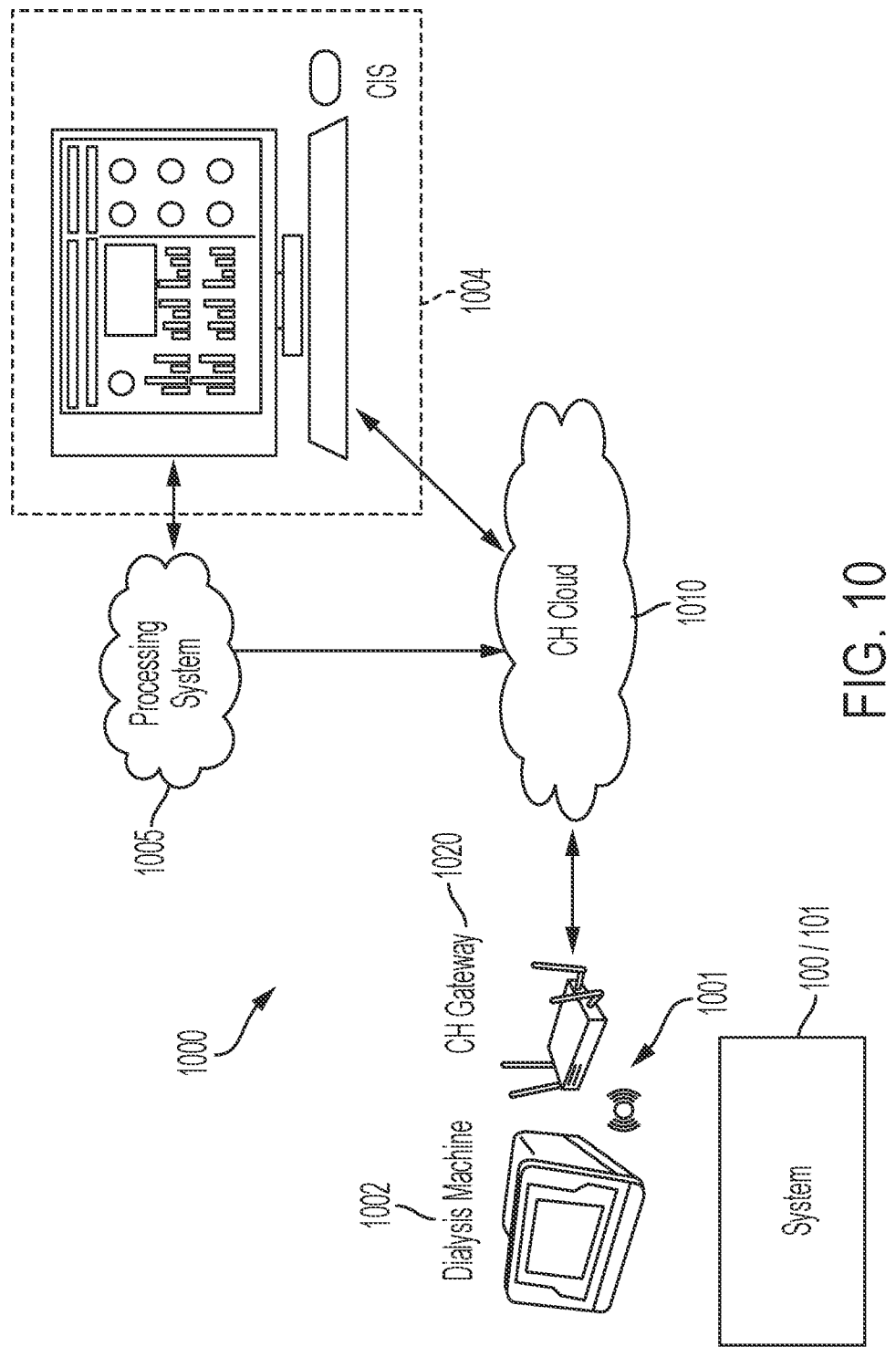
FIG. 10 illustrates a schematic of a Connected Health Service ("CHS") system according to an embodiment.

FIG. 10 is a block diagram of an example of a connected health (CH) system 1000 according to an embodiment. In an embodiment, the CH system 1000 may include more or fewer components than the components illustrated in FIG. 10. The components illustrated in FIG. 10 may be local to or remote from each other. The components illustrated in FIG. 10 may be implemented in software and/or hardware. Each component may be distributed over multiple applications and/or machines. Multiple components may be combined into one application and/or machine. Operations described with respect to one component may instead be performed by another component.

The CH system 1000 may be configured to be part of or communicate with a system such as system 100. The CH system 1000 may include, among other things, a processing system 1005, a CH cloud service 1010, and a gateway (CH Gateway) 1020 that may be used in connection with network aspects of one or more systems described herein. The processing system 1005 may include a server and/or cloud-based system that processes, compatibility-checks, and/or formats medical information, including prescription information generated at a clinical information system (CIS) 1004 of a clinic or hospital, in connection with data transmission operations of the CH system 1000. The CH system 1000 may include appropriate encryption and data security mechanisms. The CH cloud service 1010 may include a cloud-based application that serves as a communication pipeline (e.g., facilitates the transfer of data) among components of the CH system 1000, via connections to a network such as the Internet. The gateway 1020 may serve as a communication device that facilitates communication among components of the CH system 1000. In various embodiments, the gateway 1020 may be in communication with a dialysis machine 1002 (e.g., a peritoneal dialysis machine or hemodialysis machine) and a system 100 via a wireless connection 1001, such as a Bluetooth, Wi-Fi and/or other appropriate type of local or short-range wireless connection. The gateway 1020 may also be in connection with the CH cloud service 1010 via a secure network (e.g. Internet) connection. The gateway 1020 may be configured to transmit/receive data to/from the CH cloud service 1010 and transmit/receive data to/from the dialysis machine 10010 and system 100. The dialysis machine 1002 may poll the CH cloud service 1010 for available files (e.g., via the gateway 1020), and the dialysis machine 1002 and/or system 100 may temporarily store available files for processing.

It will be appreciated that reference is made, in the foregoing, to specific hardware such as the Liberty Cycler and Hydra 4200. It will be appreciated that the foregoing does not require the Liberty Cycler or Hydra 4200, and that those devices are merely examples of devices that could be used in the capacities described with respect to them herein. Other devices, combinations of devices, or systems having equivalent or similar functionality may also be used.

What is claimed is:

1. A peritoneal dialysis cycler, comprising:
a pressure sensor configured to measure an intraperitoneal pressure (IPP) of a fluid; and
a controller configured to:
monitor an intraperitoneal volume (IPV) of the fluid during a dwell period of a patient by at least monitoring the IPP during the dwell period using the pressure sensor;
determine a density of the fluid during the dwell period based on a volume and the weight of at least one sample of the fluid; and
determine a change in the IPV based at least on a change in the IPP and a change in the density of the fluid during the dwell period.

2. The peritoneal dialysis cycler of the claim 1, wherein the controller is programmed to determine the IPV using an equation comprising:

$$IPV = V_0 \frac{IPP}{IPP_0} \cdot \frac{\rho_0}{\rho}$$

where $V_0$ is a volume of the fluid at a start of the dwell period, $IPP_0$ is an IPP at the start of the dwell period, $\rho_0$ is a known density of the fluid at the start of the dwell period, and $\rho$ is the density of the fluid during the dwell period.

3. The peritoneal dialysis cycler of claim 1, wherein determining the density of the fluid during the dwell period includes extracting the at least one sample from a peritoneal cavity of a patient, determining the volume of the at least one sample and a mass of the at least one sample, and then returning the at least one sample to the peritoneal cavity.

4. The peritoneal dialysis cycler of claim 3, wherein extracting the at least one sample of the fluid is done automatically and the dwell is ended when an ultrafiltration volume (UFV) reaches a target UFV, wherein the UFV is calculated by subtracting an initial fill volume of the fluid from the IPV.

5. The peritoneal dialysis cycler of claim 3, wherein the volume of the at least one sample is calculated based on a flow sensor measurement of the fluid being extracted from the peritoneal cavity and a mass of the fluid is determined using a scale that measures the weight of the at least one sample.

6. The peritoneal dialysis cycler of claim 1, further comprising a temperature sensor configured to measure a temperature of the fluid.

7. The peritoneal dialysis cycler of claim 6, wherein the controller configured to compensate the pressure and the density based on the temperature of the fluid.

8. The peritoneal dialysis cycler of claim 1, wherein the controller is configured to determine the density periodically.

* * * * *